Nov. 7, 1939.                J. T. MURPHY                2,178,804
                HYDRAULIC CLUTCH AND REDUCTION MECHANISM
                    Filed March 26, 1937        3 Sheets-Sheet 1
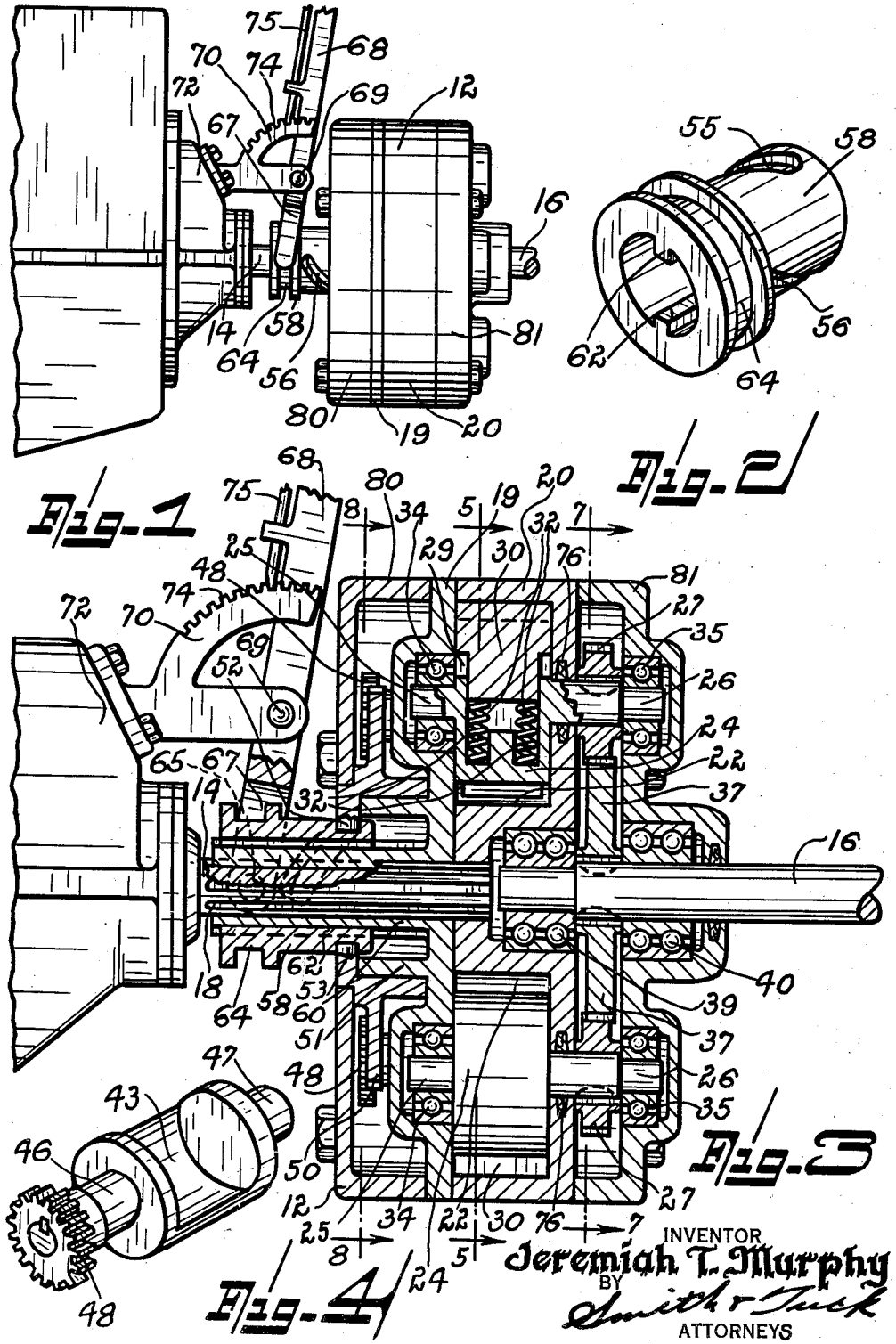
INVENTOR
Jeremiah T. Murphy
BY
Smith & Tuck
ATTORNEYS Nov. 7, 1939.  J. T. MURPHY  2,178,804
HYDRAULIC CLUTCH AND REDUCTION MECHANISM
Filed March 26, 1937   3 Sheets-Sheet 2
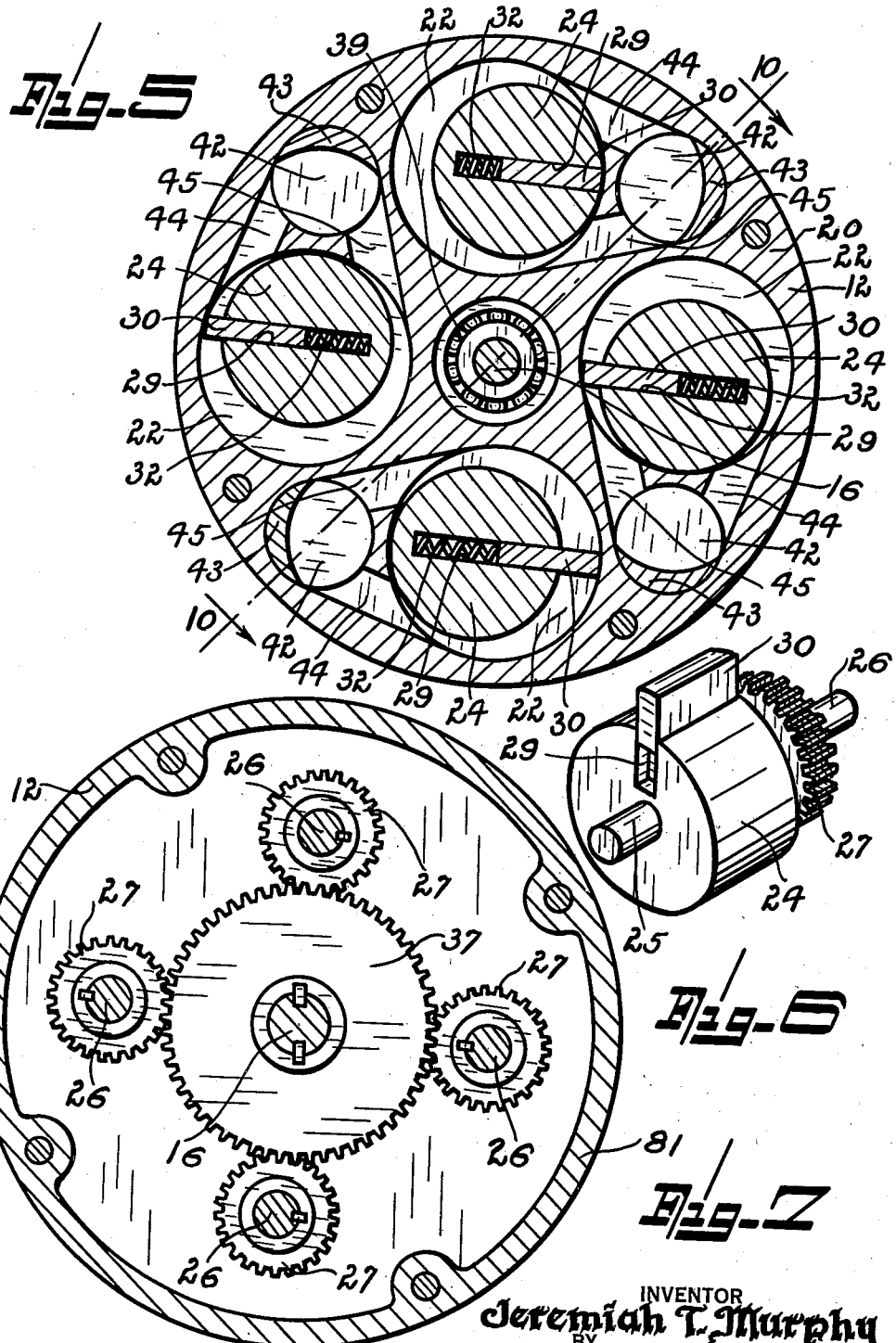
INVENTOR
Jeremiah T. Murphy
BY
ATTORNEYS

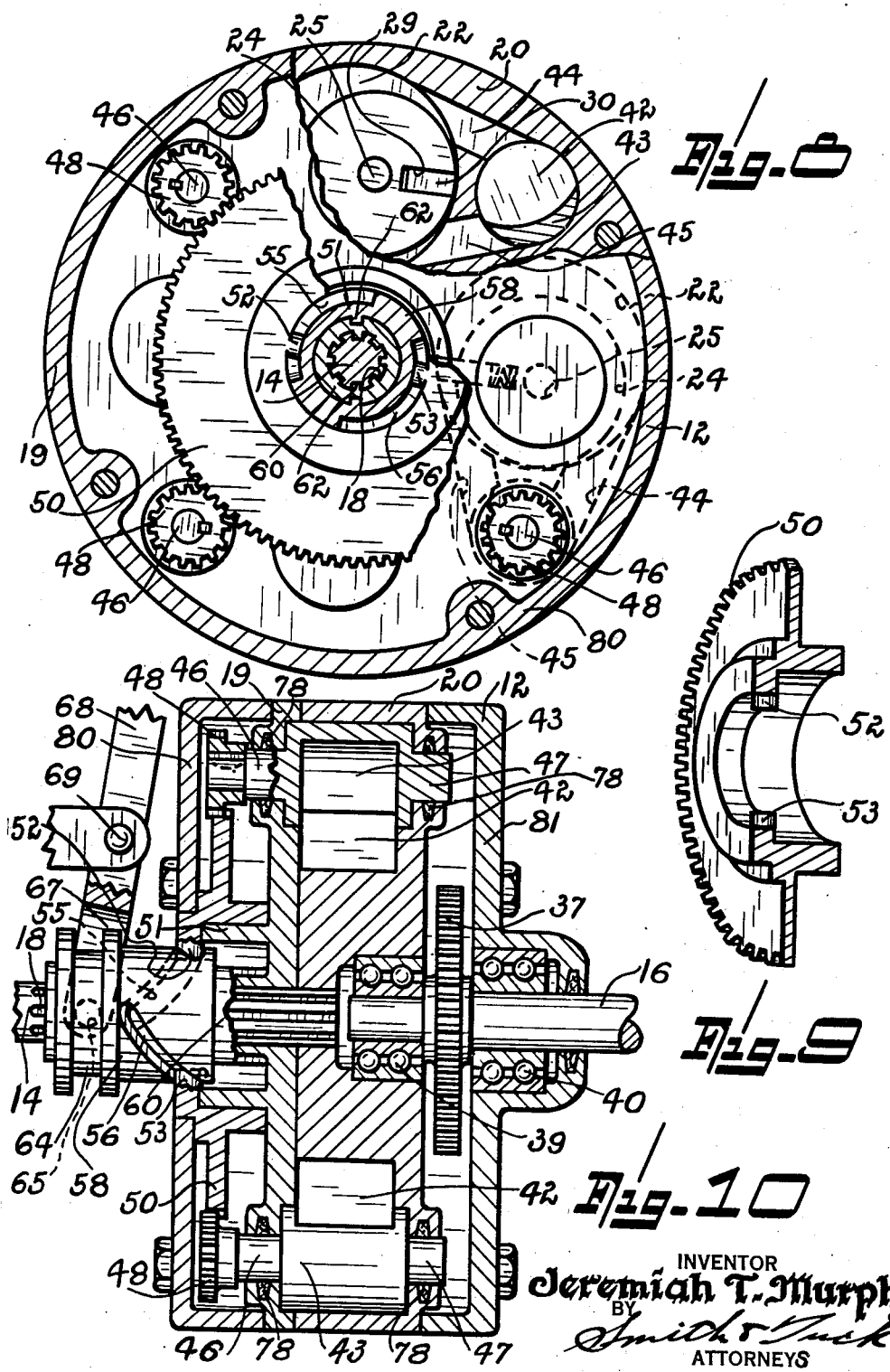

Patented Nov. 7, 1939

2,178,804

UNITED STATES PATENT OFFICE 2,178,804

HYDRAULIC CLUTCH AND REDUCTION MECHANISM

Jeremiah T. Murphy, Seattle, Wash.

Application March 26, 1937, Serial No. 133,289

2 Claims. (Cl. 74—294)

My present invention relates to the art of hydraulic, power controlling devices, and more particularly to a hydraulic clutch and reduction mechanism.

With the increased prevalence of internal combustion motors, particularly those of the higher speed ranges, it is more than ever desirable to have a clutch and reduction gear mechanism which is so constructed that the wearing parts, and the noise incidental to its use, are reduced to a minimum. It is especially desirable to have a unit which can control the output rotative speed from the newer high speed Diesel motors. The Diesel engine, because of its inherent high compression ratio, does not normally have the flexibility of the highly developed gasoline engines. Further, uniform combustion in the Diesel engine, is, to a large degree, dependent on the temperature in the combustion chamber. Consequently, it has been found that a Diesel motor will normally operate most uniformly if the speed of rotation is reasonably constant.

In my present hydraulic clutch and reduction gear mechanism, I believe that I have a satisfactory solution of this perplexing problem. My unit is constructed so that there is a minimum of wearing parts and the design is so arranged as to provide a true, neutral position when the same is desired. The other extreme is to completely seal the fluid passageways against the movement of liquid thereby imparting to the housing and to the output shaft, exact engine speed. It is believed it will be apparent that between these two extremes of full engine speed and the full disengaged position, it will be easy to select any intermediate position so that the desired rotating speed ratio between the input and the output shafts can be selected at will.

Other and more specific objects will be apparent from the following description taken in connection with the accompanying drawings, wherein—

Figure 1 is a side elevation of an internal combustion motor having my clutch and reduction gear secured in operative relationship thereto.

Figure 2 is a perspective view illustrating the shifter sleeve.

Figure 3 is a vertical, sectional view taken in the same sense as Figure 1 but with the parts enlarged and the majority of the parts being shown in section to more clearly illustrate their construction.

Figure 4 is a perspective view of one of the control valves used in my device.

Figure 5 is a cross-sectional view taken along the line 5—5 of Figure 3.

Figure 6 is a perspective view of one of my fluid rotors and its connected gear.

Figure 7 is a cross-sectional view taken along the line 7—7 of Figure 3.

Figure 8 is a cross-sectional view taken along line 8—8 of Figure 3.

Figure 9 is a perspective view, in section, along a diameter of the valve operating gear.

Figure 10 is a cross-sectional view taken along the line 10—10 of Figure 5.

Referring to the drawings, throughout which like reference characters indicate like parts, 12 designates generally the housing of my device. This is entered at one end by the driving shaft 14 and at the opposite end, and coaxially disposed with housing 12 and shaft 14, by the driven or output shaft 16. Shaft 14 is splined substantially throughout its exposed length as 18 so as to provide a driving connection between shaft 14 and members 19 and 20 of housing 12. In housing member 20 are provided preferably a plurality of pump or rotor chambers 22. Throughout the present illustration I have indicated four such units. This is not an essential relationship, however. It is desirable to have a plurality of units so that the different rotors can be slightly out of phase with each other and thus provide an even or uniform torque upon output shaft 16.

Disposed within chambers 22 are pump rotors 24. These rotors are, preferably, formed with shaft extensions as 25 and 26 one of which, as 26 in turn has secured to it the driving gear 27. Each rotor is provided with a slot 29 in which is slidably disposed, for movement radially of the motor, the rotor vane 30. To insure certain functioning of vane 30 to the end that it will always be in its outwardly disposed position, I have provided compression springs as 32 which are seated within the rotor proper and exert their energy against the inner edge or face of vane 30.

Each rotor unit is suitably journaled upon bearings as 34 and 35. These should preferably be of the antifriction type if my device is to be used for high speed work. Gear 27 which is secured to shaft extension 26 is adapted to operatively engage a large gear 37 which is coaxially disposed with respect to the housing and is keyed or otherwise secured to the output shaft 16. Shaft 16 is preferably supported by spaced bearings as 39 and 40.

Disposed adjacent to chambers 22 are valve chambers 42 in which are disposed the rotatable valves 43. These valves, the construction of which is probably best illustrated in Figure 4, are arranged to provide an unrestricted flow of liquid from chambers 22 through passageways 44 through the valve chambers 42 and then through passageways 45 back into chambers 22, or vice versa. It being understood that each rotor-valve assembly is a separate unit. If valve 43 is made after the teachings of my present drawings it will be possible to have any intermediate setting thereof; it may be set so that it will either completely shut off the flow of liquid; will provide no resistance to the flow of liquid; or will assume any intermediate control position. Valves 43 are provided with shaft extensions 46 and 47. These provide journals which are seated within housing members 19 and 20 but as these valves do not revolve completely, there is no need for special bearing on these journals.

The extreme end of shaft extension 46 is provided with a small pinion as 48. This pinion together with the pinions of the other control valves, mesh with and are operated by the large gear 50 which is coaxially disposed with housing 12. This gear and pinion arrangement has been found to be a very convenient control means for valves 43, also it is desired to point out that this mechanism is merely an operating means which might be discarded in favor of connecting linkage, or chain arrangements, for certain types of installations. Normally, however, in high speed installations, the matter of balancing becomes such a factor that the present arrangement is particularly recommended. Operating gear 50 is mounted for limited rotation upon an annular ring 51 which is normally formed as part of housing member 19. The gear has spaced inwardly extending cylindrical lugs 52 and 53 which in turn, operatively engage spiral grooves 55 and 56 formed on the outer surface of the operating sleeve 58. Sleeve 58 is disposed for limited reciprocation upon an outwardly extending hub 60, also formed as part of housing 19. Because of the spiral operating grooves 55 and 56, it is necessary that the angular position of sleeve 58 with respect to housing 12, remain unchanged. To this end I have provided splines or keys at 62 which operatively engage keyways cut in the outer surface of hub 60.

Sleeve 58 is provided with a flanged annular groove 64 in which is adapted to ride, the inwardly extending posts 65 formed on opposite sides of yoke member 67. Yoke 67 is formed as part of the lower end of the operating lever 68 which is pivoted at 69 to the fixedly supported quadrant member 70. For ease in maintaining adjusted positions I provide that member 70 be formed with a plurality of ratchet teeth 74 adapted to receive a pawl member 75, operatively secured to lever 68.

To assure satisfactory performance I have provided that housing members 19 and 20 secure in position the pump, or rotor members and the valve or control members. These are either provided with dead housed bearings or are provided with oil packing rings as 76 and 78 so that the fluid of the pump or rotor chambers cannot easily be forced from those chambers. I then provide cover plates as 80 and 81 covering respectively the valve operating gearing and the reduction drive gearing which consists of a plurality of pinions 27 and the large gear 37.

Method of operation

When my mechanism is installed, ready for use, the driving effort is applied to shaft 14 with the output shaft 16 connected to the load to be driven. If the control valves 43 are turned as illustrated in Figure 5, the housing 12, with its associated parts, will naturally be carried around with shaft 14 and travel at its speed. With the valves set as indicated, there will be nothing but frictional resistance encountered in moving the fluid, consequently, assuming that the load normally tends to hold shaft 16 from rotating, gear 37, which is secured to shaft 16, will drive pinions 27 and thereby rotate, or revolve, rotors 24. However, in this case there will be no driving effort placed upon shaft 16. If then, by adjustment of lever 68, the valves 43 are turned after the showing of Figure 8, there will be a restriction in the flow of the fluid and, as a result, shaft 16 will be revolved in the same direction as housing 12, but at a reduced speed limit. If the setting of valve 43 is changed so that the entire flow of fluid is arrested, shaft 16 will pick up the full speed of housing 12.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:

1. In a hydraulic coupling, the combination with a drive shaft, a housing having spaced pumping chambers each provided with a circuitous pumping passage, said housing having a central sleeve rigid with the shaft and a concentric bearing ring, and a driven shaft journaled in the housing, of rotors in said chambers and a planetary gearing operatively connecting said rotors and the driven shaft, rotary valves crescent-shaped in cross section journaled in the housing to control said passages, an operating collar longitudinally movable on said sleeve, an operating gear journaled on the bearing ring, co-acting means on the collar and operating gear for adjusting the latter, and a set of planetary gears interposed between said operating gear and said valves.

2. In a hydraulic coupling, the combination with a drive shaft, a housing having spaced pumping chambers each provided with a circuitous pumping passage, said housing having a central hub rigid with the shaft and a concentric bearing ring, and a driven shaft journaled in the housing, of rotors in said chambers and a planetary gearing operatively connecting said rotors and the driven shaft, rotary valves crescent-shaped in cross-section journaled in the housing to control said passages, an operating gear journaled on the bearing ring, a spirally grooved collar rotatable with and slidable on the central hub and means for moving the collar, lugs on said operating gear located in said grooves for adjustment of the operating gear, and a set of planetary gears interposed between said operating gear and said valves.

JEREMIAH T. MURPHY.